US008396848B2

(12) United States Patent
Getsch et al.

(10) Patent No.: US 8,396,848 B2
(45) Date of Patent: Mar. 12, 2013

(54) CUSTOMIZABLE PARAMETER USER INTERFACE

(75) Inventors: Timothy E. Getsch, Redmond, WA (US); Sumit Chauhan, Sammamish, WA (US); Clinton D. Covington, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/475,401

(22) Filed: Jun. 26, 2006

(65) Prior Publication Data

US 2007/0299823 A1    Dec. 27, 2007

(51) Int. Cl.
    *G06F 17/30* (2006.01)
(52) U.S. Cl. ...................................... 707/705
(58) Field of Classification Search .................. 707/1–3; 726/22
    See application file for complete search history.

(56) References Cited

U.S. PATENT DOCUMENTS

| 5,842,209 | A | 11/1998 | Mocek et al. ..................... 707/4 |
| 5,966,707 | A | 10/1999 | Van Huben et al. ............. 707/10 |
| 6,243,703 | B1 | 6/2001 | Couch et al. ..................... 707/10 |
| 6,285,998 | B1 | 9/2001 | Black .................................. 1/1 |
| 6,356,887 | B1 | 3/2002 | Berenson ............................ 1/1 |
| 6,356,920 | B1 * | 3/2002 | Vandersluis .................. 715/210 |
| 6,891,552 | B1 | 5/2005 | Bush .............................. 345/762 |
| 6,910,208 | B1 | 6/2005 | Zimniewicz .................. 717/174 |
| 2004/0024720 | A1 | 2/2004 | Fairweather ..................... 706/46 |
| 2004/0027376 | A1 | 2/2004 | Calder et al. ................. 345/755 |
| 2004/0056894 | A1 | 3/2004 | Zaika et al. .................... 345/762 |
| 2004/0073565 | A1 | 4/2004 | Kaufman et al. ............. 707/101 |
| 2004/0225635 | A1 | 11/2004 | Toyama et al. ..................... 707/1 |
| 2004/0243598 | A1 | 12/2004 | Sleeper et al. ................ 707/100 |
| 2005/0102284 | A1 | 5/2005 | Srinivasan et al. ................ 707/4 |
| 2005/0114359 | A1 | 5/2005 | Li et al. ......................... 707/100 |
| 2007/0011742 | A1 * | 1/2007 | Nakayama et al. ............. 726/22 |

FOREIGN PATENT DOCUMENTS

| EP | 1 143 667 A2 | 10/2001 |
| JP | 2004-110558 | 8/2004 |
| JP | 2008-511935 | 3/2006 |
| KR | 1020030056120 A | 4/2003 |
| WO | WO 2006026686 A1 | 3/2006 |

OTHER PUBLICATIONS

Petropoulos, Michalis, "Building XML query forms and reports with XQForms" 2002, p. 541-558.*
Gareth Cronin, "Dynamic Generation of a Database User-Interface based on Database Meta-data", http://web.archive.org/web/20030430171035/homepages.paradise.net.nz/garethc/project/BeanBase.pdf, University of Auckland, Undergraduate Project, Summer 2000/2001, pp. 1-54.
"SprintDB Pro Help Index", http://www.kaione.com/Help_Main/Pro_Help_Index/pro_help_index.html, last accessed Oct. 17, 2002, 138 pgs.
Office Action issued Jan. 17, 2010, in IL Application No. 194963.

(Continued)

*Primary Examiner* — Sheree Brown
(74) *Attorney, Agent, or Firm* — Merchant & Gould (57) ABSTRACT

A customized form is provided for entering parameters associated with a query. A user may desire to modify a report resulting from a query to a database. To enter the parameters for modification, a customized form is displayed to the user. The customized form allows for entry of the parameters according to prompts that are related by their presentation to the form being generated.

20 Claims, 10 Drawing Sheets

OTHER PUBLICATIONS

Office Action issued Jun. 2, 2010, in CN Application No. 200780023872.8, *w/Translation*.

Office Action issued Apr. 28, 2011, in AU Application No. 2007265527.

Office Action issued May 19, 2011, in RU Application No. 2008151786 *w/Translation*.

Petropoulos, M.; "Building XML query forms and reports with XQForms"; 2002; www.elsevier.com/locate/comnet.

Office Action issued Oct. 4, 2011, in MX Application No. MX/a/2008/015237 w/English Summary.

EP Search Report dated Apr. 12, 2012, issued in EP Pat. Appl. No. 07796453.4.

Uchida, Y.; "Intensive Lecture for Using Personal Computer: End User Computing starting with 'Access' (4)," I/O vol. 22, No. 11, pp. 163-168, Kogakusha Co., Ltd., Japan, Nov. 1, 1997, with English Summary.

Nishiyama, H.; "Simple! How to Build Database; We Want to Sort Data More Easily"; vol. 5 No. 17, pp. 32 to 60, Nikkei Business Publications, Inc., Japan, Sep. 1, 2000, with English Summary.

Office Action mailed Jun. 8, 2012, in JP Pat. Appl. No. 2009-518216 w/Translation.

Office Action mailed Mar. 19, 2012, in IL Pat. Appl. No. 194963 w/Translation.

Office Action mailed May 9, 2012, in MX Application No. MX/a/2008/015237 w/English Summary.

\* cited by examiner

Sales by Year

01-Feb-2006

1997 Summary

| Quarter: | Orders Shipped: | Sales: |
|---|---|---|
| 1 | 92 | $143,703 |
| 2 | 92 | $145,655 |
| 3 | 105 | $144,320 |
| 4 | 109 | $175,169 |
| Totals: | 398 | $608,847 |

1997 Details

| Line Number: | Shipped Date: | Order ID: | Sales: |
|---|---|---|---|
| 1 | 01-Jan-1997 | 10392 | $1,440 |
| 2 | 02-Jan-1997 | 10397 | $717 |
| 3 | 03-Jan-1997 | 10393 | $2,557 |
| 4 | 03-Jan-1997 | 10394 | $442 |
| 5 | 03-Jan-1997 | 10395 | $2,123 |
| 6 | 06-Jan-1997 | 10396 | $1,904 |
| 7 | 08-Jan-1997 | 10399 | $1,766 |
| 8 | 08-Jan-1997 | 10404 | $1,591 |
| 9 | 09-Jan-1997 | 10398 | $2,506 |
| 10 | 09-Jan-1997 | 10403 | $855 |
| 11 | 10-Jan-1997 | 10401 | $3,869 |
| 12 | 10-Jan-1997 | 10402 | $2,714 |
| 13 | 13-Jan-1997 | 10406 | $1,831 |
| 14 | 14-Jan-1997 | 10408 | $1,622 |
| 15 | 14-Jan-1997 | 10409 | $319 |
| 16 | 15-Jan-1997 | 10410 | $802 |
| 17 | 15-Jan-1997 | 10412 | $335 |
| 18 | 16-Jan-1997 | 10380 | $1,314 |
| 19 | 16-Jan-1997 | 10400 | $3,063 |
| 20 | 16-Jan-1997 | 10413 | $2,123 |
| 21 | 17-Jan-1997 | 10414 | $225 |
| 22 | 21-Jan-1997 | 10411 | $967 |

Sales by Year

01-Feb-2006

| 1997 Summary | | | |
|---|---|---|---|
| Quarter: | Orders Shipped: | | Sales: |
| 3 | 31 | | $37,545 |
| Totals: | 31 | | $37,545 |

1997 Details

| Line Number: | Shipped Date: | Order ID: | Sales: |
|---|---|---|---|
| 1 | 01-Jul-1997 | 10580 | $1,014 |
| 2 | 02-Jul-1997 | 10581 | $310 |
| 3 | 04-Jul-1997 | 10571 | $551 |
| 4 | 04-Jul-1997 | 10579 | $318 |
| 5 | 04-Jul-1997 | 10583 | $2,238 |
| 6 | 04-Jul-1997 | 10584 | $594 |
| 7 | 09-Jul-1997 | 10568 | $155 |
| 8 | 09-Jul-1997 | 10586 | $24 |
| 9 | 09-Jul-1997 | 10587 | $807 |
| 10 | 10-Jul-1997 | 10585 | $143 |
| 11 | 10-Jul-1997 | 10588 | $3,120 |
| 12 | 11-Jul-1997 | 10569 | $890 |
| 13 | 14-Jul-1997 | 10582 | $330 |
| 14 | 14-Jul-1997 | 10589 | $72 |
| 15 | 14-Jul-1997 | 10590 | $1,101 |
| 16 | 14-Jul-1997 | 10595 | $4,725 |
| 17 | 16-Jul-1997 | 10591 | $813 |
| 18 | 16-Jul-1997 | 10592 | $516 |
| 19 | 16-Jul-1997 | 10594 | $566 |
| 20 | 18-Jul-1997 | 10597 | $718 |
| 21 | 18-Jul-1997 | 10598 | $2,389 |
| 22 | 21-Jul-1997 | 10599 | $493 |
| 23 | 21-Jul-1997 | 10600 | $480 |
| 24 | 22-Jul-1997 | 10601 | $2,285 |
| 25 | 22-Jul-1997 | 10602 | $49 |
| 26 | 25-Jul-1997 | 10578 | $477 |

*Fig. 10*

CUSTOMIZABLE PARAMETER USER INTERFACE

BACKGROUND

A database is an organized collection of data. A database management system (DBMS) is a computer program (or more typically, a suite of them) designed to manage a database and run operations on the data requested by numerous clients. A DBMS allows queries to be written and executed to retrieve the data. A DBMS may also allow creation of forms or reports. More refined queries may also be executed from the DBMS. These customized queries/reports/forms may require that certain parameters be provided before a query/report/form is executed against the database. Such customized queries/reports/forms typically involve several complicated steps and the result is typically difficult to understand or modify.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A customizable user interface is provided for entering requested parameters related to a database query. The customized parameter user interface provides parameter entry dialogs/windows in correlation to a data view (e.g., form or report) that is produced according to a database query. The parameters entered may provide for modification of the data view. Also, the manager of the database may structure data views of a database to automatically include prompts for parameters before results are returned by the database. These prompts may be customized by the manager and may be provided according to dialogs such as pop-ups, pull-down menus, fly-outs, or a variety of other user interface components. Accordingly, an intuitive, efficient and modifiable data view is provided.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are herein described more fully below with reference to the accompanying drawings, which form a part hereof, and which show specific examples for practicing the embodiments. However, embodiments may be implemented in many different forms and should not be construed as limited to the embodiments set forth herein; rather, these embodiments are provided so that this disclosure will be thorough and complete, and will fully convey the scope of the subject matter to those skilled in the art. Embodiments disclosed may be practiced as methods, systems or devices. Accordingly, embodiments disclosed may take the form of an entirely hardware implementation, an entirely software implementation or an implementation combining software and hardware aspects. The following detailed description is, therefore, not to be taken in a limiting sense.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Figure 1:
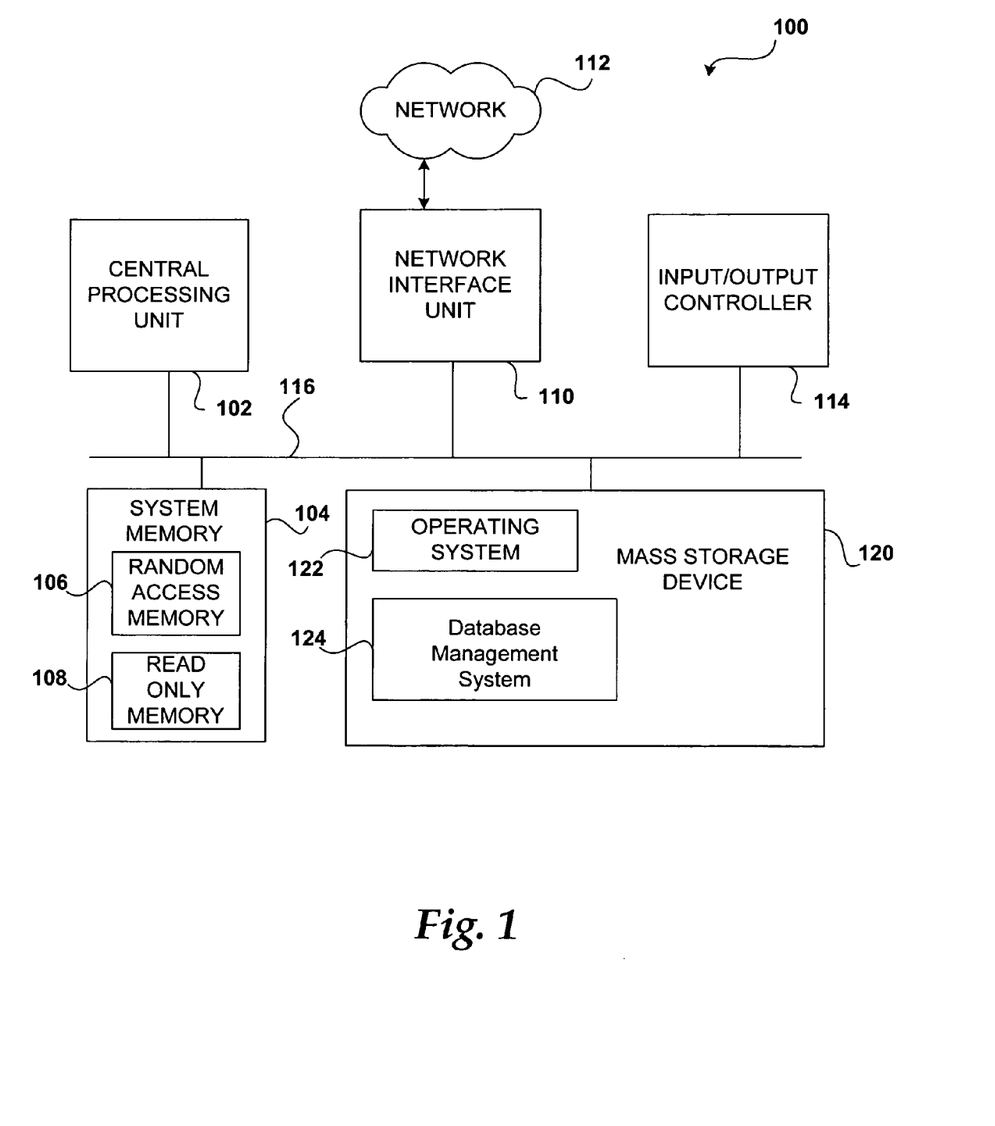
FIG. 1 illustrates an exemplary computing architecture for a computer.

Referring now to the drawings, in which like numerals represent like elements. FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an exemplary computer architecture for a computing device 100 utilized in various embodiments will be described. For example, the computer may be configured as a personal computer, a mobile computer and the like. As shown, computing device 100 includes a central processing unit 102 ("CPU"), a system memory 104, including a random access memory 106 ("RAM") and a read-only memory ("ROM") 108, and a system bus 116 that couples the memory to the CPU 102. A basic input/output system containing the basic routines that help to transfer information between elements within the computer, such as during startup, is stored in the ROM 108. The computing device 100 further includes a mass storage device 120 for storing an operating system 122, application programs, and other program modules, which will be described in greater detail below.

The mass storage device 120 and its associated computer-readable media provide volatile and non-volatile storage for the computing device 100. The computer readable media may include any type of removable and/or non-removable media.

The computing device 100 operates in a networked environment using logical connections to remote computers through a network 112, such as the Internet. The computing device 100 may connect to the network 112 through a network interface unit 110 connected to the bus 116.

The computing device 100 may also include an input/output controller 114 for receiving and processing input from a number of devices, such as: a keyboard, mouse, electronic stylus and the like. Similarly, the input/output controller 114 may provide output to a display screen, a printer, or some other type of device (not shown).

As mentioned briefly above, a number of program modules and data files may be stored in the mass storage device 120 and RAM 106 of the computing device 100, including an operating system 122 suitable for controlling the operation of a networked computer. The mass storage device 120 and RAM 106 may also store one or more program modules. In particular, the mass storage device 120 and the RAM 106 may store a local component of a Database Management System (DBMS) 124.

The local component of the DBMS 124 includes functionality for presenting a customized parameter user interface for entering parameters in relation to a database search query. The customized parameter user interface provides parameter entry dialogs/windows in correlation to a data view (e.g., form or report) that is produced according to a database query. The parameters entered may allow for modification of the data view. The modification may occur without altering the original query statement. The modification may also occur by directly modifying the query statement. The persistence of the modification may be associated with the record source, a query object, and/or a parameter property. Also, the manager of the database may structure data views of a database to automatically include prompts for parameters before results are returned by the database. These prompts may be customized by the manager and may be provided according to dialogs such as pop-ups, pull-down menus, fly-outs, or a variety of other user interface components. Accordingly, an intuitive, efficient and modifiable data view is provided.

As used herein, "Control" generally refers to a child display frame an application uses in conjunction with another display frame to perform simple input and output (I/O) tasks. Controls are most often used within dialog boxes, but may also be used in other display frames. Controls within dialog boxes provide the user with the means to type text, choose options, and direct a dialog box to complete its action. Controls in other display frames provide a variety of services, such as letting the user choose commands, view status, and view and edit text. One example of a control is a right-click selection menu that presents a child display frame of an application's user interface.

"Data view" generally refers to a form, report and/or table that represents a collection of data from a database. The collection of data from the database may be provided in the form or report according to a database search query. The data view may be modified by the entry of any parameters according to the customized parameter user interface.

As used herein below, "Parameter" generally refers to any data value or set of data values associated with the data included in a data view. Entered parameters may modify a particular data view when entered according to the customized parameter user interface.

"Parameter entry prompt" generally refers to a user interface dialog that is provided for entry of a parameter in association with a data view. The user interface dialog may take the form of a display frame, pop-up, pull-down menu, fly-out, or a variety of other user interface components. Entry of the parameter in the parameter entry prompt may be provided as a text box entry, a pull-down selection box, or other types of data entry user interface components.

"Parameter filter property" (PFilter) generally refers to a property that corresponds to an entered parameter associated with a data view. The parameter filter property is added to the query statement according to a Boolean AND operation to modify the results included in the data view.

"Parameter form property" (PForm) generally refers to a property that when activated indicates that a customized parameter form is associated with a particular data view.

"Record source" generally refers to a stored property corresponding to the query statement that represents the data view. When a parameter is entered in accordance with the present disclosure, the parameter may be added according to a Boolean AND operation to the record source.

"Query statement" corresponds to the statement used for a query to the database that produces the data view. In a structured query language (SQL) database, the query statement corresponds to the SQL statement passed to the database engine for retrieving the database results corresponding to the data view.

Figure 2:
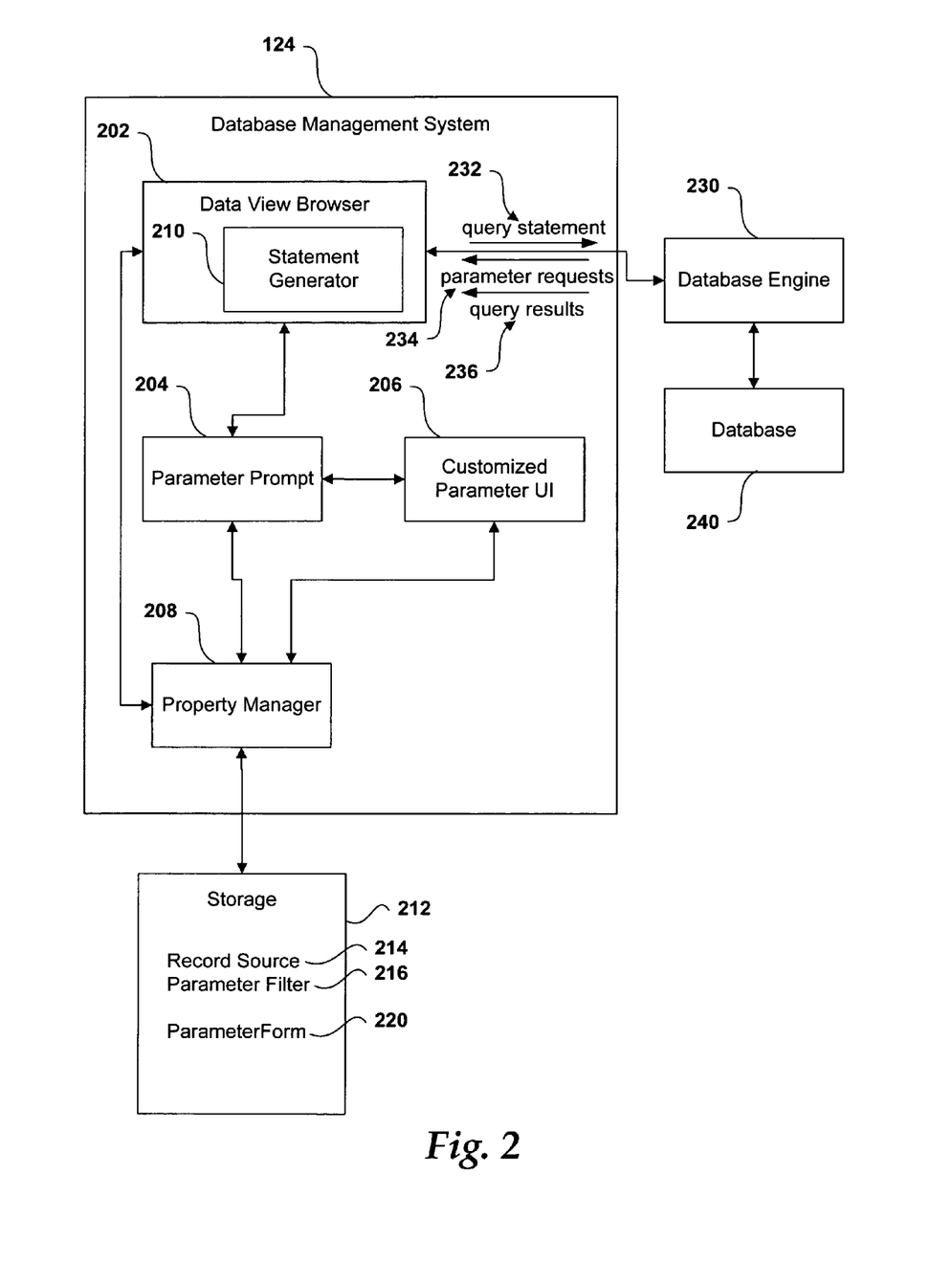
FIG. 2 illustrates a functional block diagram of an exemplary system for providing a customized parameter user interface within a database management system (DBMS)

FIG. 2 illustrates a functional block diagram of an exemplary system for providing a customized parameter user interface within a database management system (DBMS), in accordance with the present disclosure. DBMS interface 124 includes data view browser 202, parameter prompt module 204, customized parameter UI module 206, and property manager 208. Data view browser 202 further includes statement generator 210 and is coupled to database engine 230. Database engine 230 is coupled to database 240. Property manager 208 is coupled to storage 212. Storage 212 includes entries for a record source 214, a parameter filter property 216, and a parameter form property 220.

In operation, data view browser 202 communicates between database engine 230 and the other functional blocks of DBMS 124 to provide a data view (e.g., a form or report, see FIG. 5) of data contained within database 240. Statement generator 210, included in data view browser 202, generates query statement 232 that is passed to database engine 230. If query statement 232 is executable in its present form, database engine 230 returns query results 236 to data view browser 202. If instead, query statement 232 is not executable because it requires identification of an additional parameter not included in query statement 232, then database engine 230 returns any necessary parameter requests to data view browser 202.

Data view browser 202 communicates any parameter requests 234 to parameter prompt module 204. Parameter prompt module 204 consults with property manager 208 to determine if a customized parameter form is associated with current data view. Property manager 208 accesses a list of properties (e.g., 214-220) in storage 212 to make the determination. Storage 212 may be a temporary or permanent storage and may correspond to system memory 104 or mass storage device 120 shown in FIG. 1.

If the properties (e.g., 214-220) in mass storage device indicate that a customized parameter form is associated with the data view, functionality provided by customized parameter UI module 206 is used to display the customized parameter form in association with the data view. If however, the properties (e.g., 214-220) indicate that no customized parameter form is associated with the data view, a general parameter form is provided by parameter prompt module 204 to solicit entry of the requested parameter from the user.

The functional blocks described in FIG. 2 are not an exhaustive representation of the functional blocks possibly associated with a DBMS. Additional or fewer functional blocks may be included and the DBMS still operates for its intended purpose. For example, in an alternative embodiment, it may be that customized parameter UI module 206 communicates directly with data view browser 202 rather than communicating through parameter prompt module 204. In another alternative embodiment, a decision may be made by a database manager that every form or report to be produced for a particular database requires a customized parameter form. In this embodiment, parameter prompt module 204 and certain of the properties (e.g., 214-220) of storage 212 may be unnecessary since each data view will have an associated customized parameter form.

Figure 3:
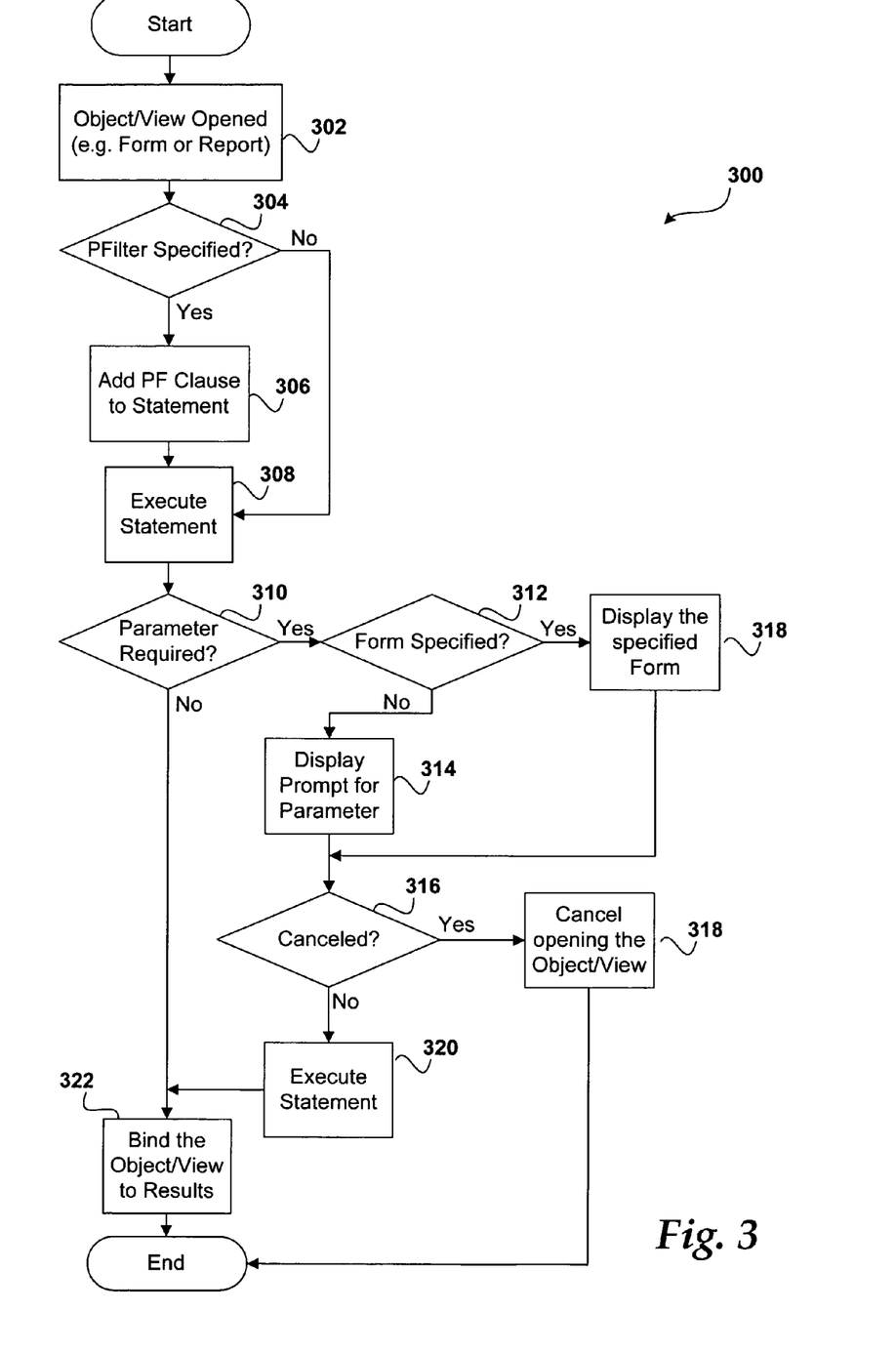
FIG. 3 is an operational flow diagram of a process for providing a customized parameter entry form in association with a database query.

FIG. 3 is an operational flow diagram of a process for providing customized parameter entry form in association with a database query, in accordance with the present disclosure. Processing starts when a query has been generated for a database that does not include all the parameters necessary for execution of the query such that parameters are required to be entered. Processing continues with operation 302.

At operation 302, an object/view is being opened (e.g., a form or report) that returns the response to the query in a readily understandable format. While the report is being opened, processing continues with decision operation 304.

At decision operation 304, a determination is made whether a PFilter property is specified for the query. The PFilter property indicates a WHERE clause in the query, such that an additional filtering of the query is being requested. If no PFilter property is being specified, processing advances to operation 308. However, if a PFilter property is specified, processing continues to operation 306.

At operation 306, a PFilter clause corresponding to the specified PFilter property is added to the query statement. For example, if the PFilter property is one that indicates an alphabet limitation of results beginning with the letter "A", and the original query was for current customers, then a clause is added such that the resulting query is for customers that start with the letter "A". Processing continues at operation 308.

At operation 308, the query statement is executed. While the query statement is executed, processing continues with decision operation 310.

At decision operation 310, a determination is made whether execution of the query statement requires a parameter for completion. If no parameter is required, then processing advances to operation 322. However, if a parameter is required to be entered, then processing moves to decision operation 312.

At decision operation 312, a determination is made whether a form has been specified already for use for requesting the entry of the parameter. In one embodiment, a parameter form is specified when indicated by a PForm property. If no form is specified, processing moves to operation 314.

At operation 314, a prompt is provided for entering the parameter that does not include the customizations available in a parameter form generated according to the present disclosure. Once the prompt is displayed, processing continues with decision operation 316.

If however, a parameter form is specified, processing continues with operation 318. At operation 318, the specified form is displayed for entry of the parameter. Once the specified form is displayed, processing continues with decision operation 316.

At decision operation 316, a determination is made whether the user has selected to cancel the query. The query can be canceled at any time at the user's selection. If the user has canceled the query, processing moves to operation 318. At operation 318, the opening of the object/view of the data is canceled, and processing ends.

If however, the query has not been canceled, processing moves to operation 320. At operation 320, the execution of the statement, modified with the entries of the parameters, is executed. The modification may occur without altering the original query statement. The modification may also occur by directly modifying the query statement. The persistence of the modification may be associated with the record source, a query object, and/or a parameter property. Processing continues at operation 322.

At operation 322, the results of the query are bound to the object/view and the results are shown as modified by the entered parameters. Once the object/view is displayed, process 300 ends, and processing move on to other tasks.

Figure 4:
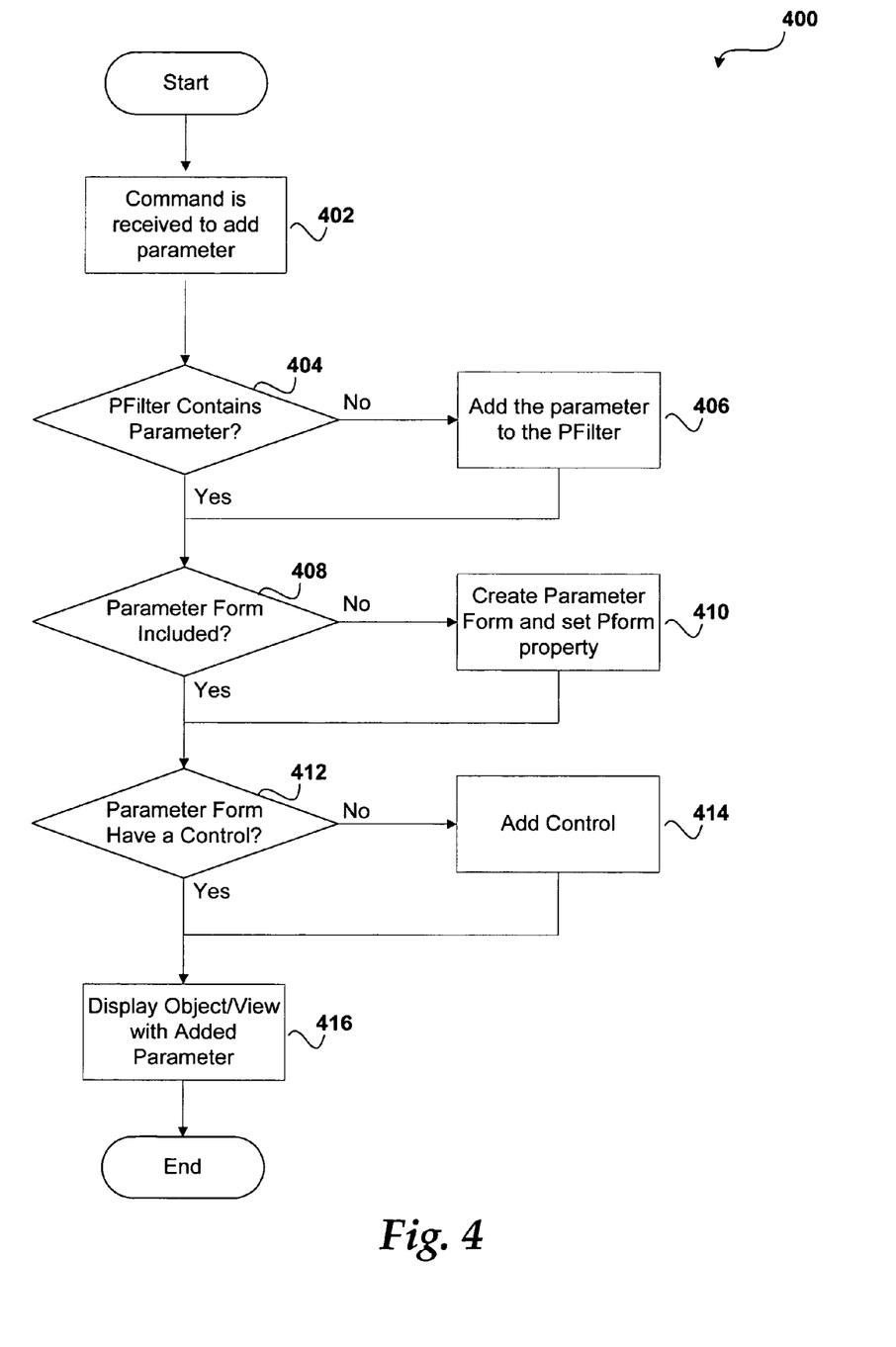
FIG. 4 illustrates an operational flow diagram for adding a parameter to a customized parameter form.

FIG. 4 illustrates an operational flow diagram for adding a parameter to a customized parameter form, in accordance with the present disclosure. Processing starts where a developer desires to add a parameter to a customized parameter form. Processing continues with operation 402.

At operation 402, a command is received to add a parameter to a customized parameter form. The command may come from a pull down menu selection or other edit selection by the developer of the customized form. Processing continues with decision operation 404.

At decision operation 404, a determination is made whether the PFilter property already contains the parameter being added. If the PFilter property does not contain the parameter, processing moves to operation 406 where the parameter is added to PFilter property. If the PFilter property was already populated with the parameter or once the PFilter property is populated with the parameter, processing moves to decision operation 408.

At decision operation 408, a determination is made whether a PForm property indicates that a parameter form has been already designated for inclusion of the property. If no parameter form has already been generated, processing moves to operation 410 where a parameter form is created and the PForm property is set.

If the parameter form for inclusion of the parameter was already created, or once the parameter form is created, processing continues with operation decision operation 412.

At decision operation 412, a determination is made whether a control has been generated on the form for entry of the parameter. If no control is present, processing moves to operation 414 where a process is commenced for generating a control on the parameter form for entry of the parameter.

If a control was already generated, or once the control is generated, processing continues to operation 416. At operation 416, the object/view of the data with the added parameter may be displayed after execution of the query statement. Once the object/view is displayed, process 400 ends, and processing moves to other tasks.

Figure 5:
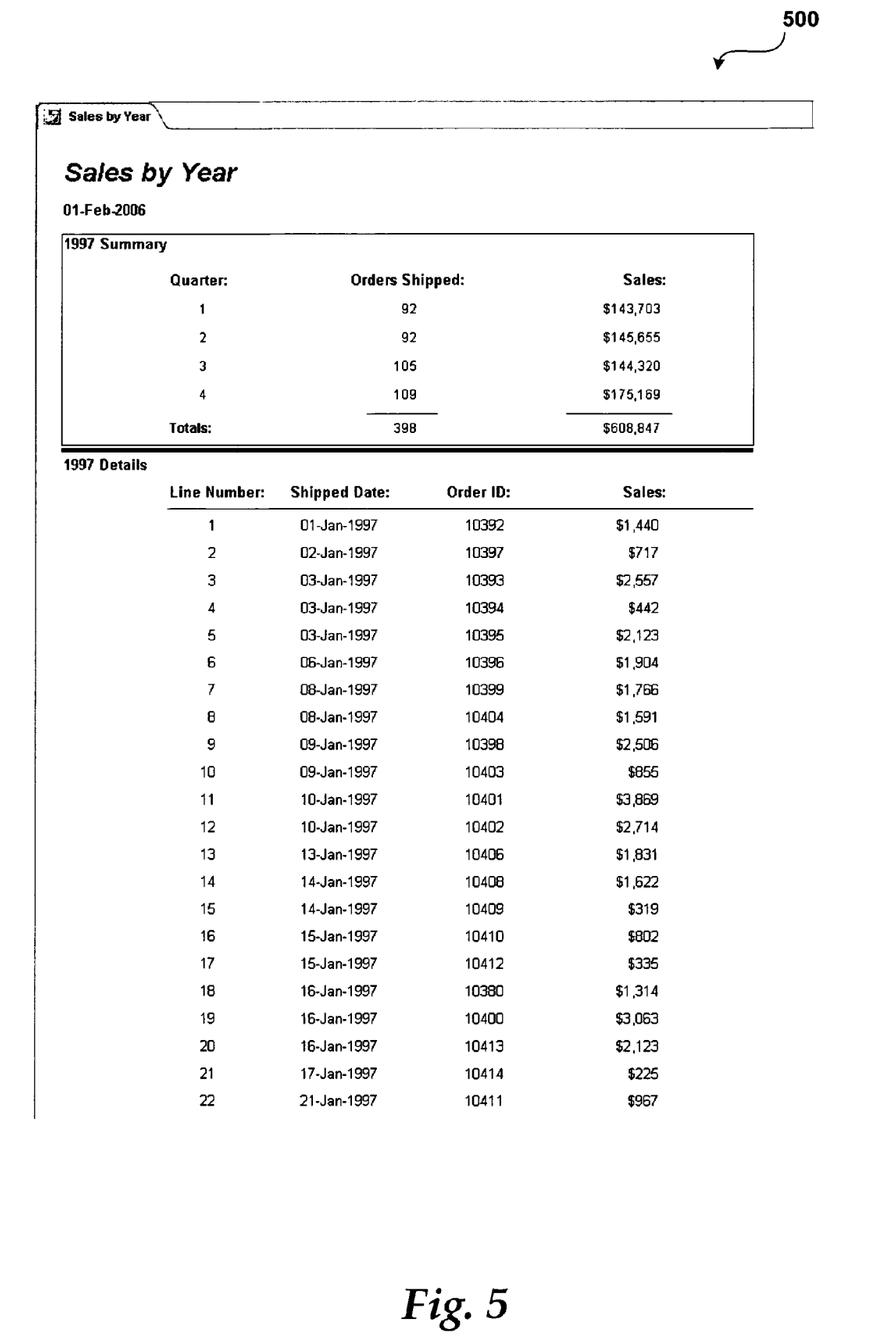
FIG. 5 illustrates an exemplary report before being modified by entry of an additional parameter to the query that generated the form.

FIG. 5 illustrates an exemplary report before being modified by entry of an additional parameter to the query that generated the form, in accordance with the present disclosure.

Report 500 includes a listing of sales by year for a product, the product numbers, when the products shipped and the sales amounts.

Figure 6:
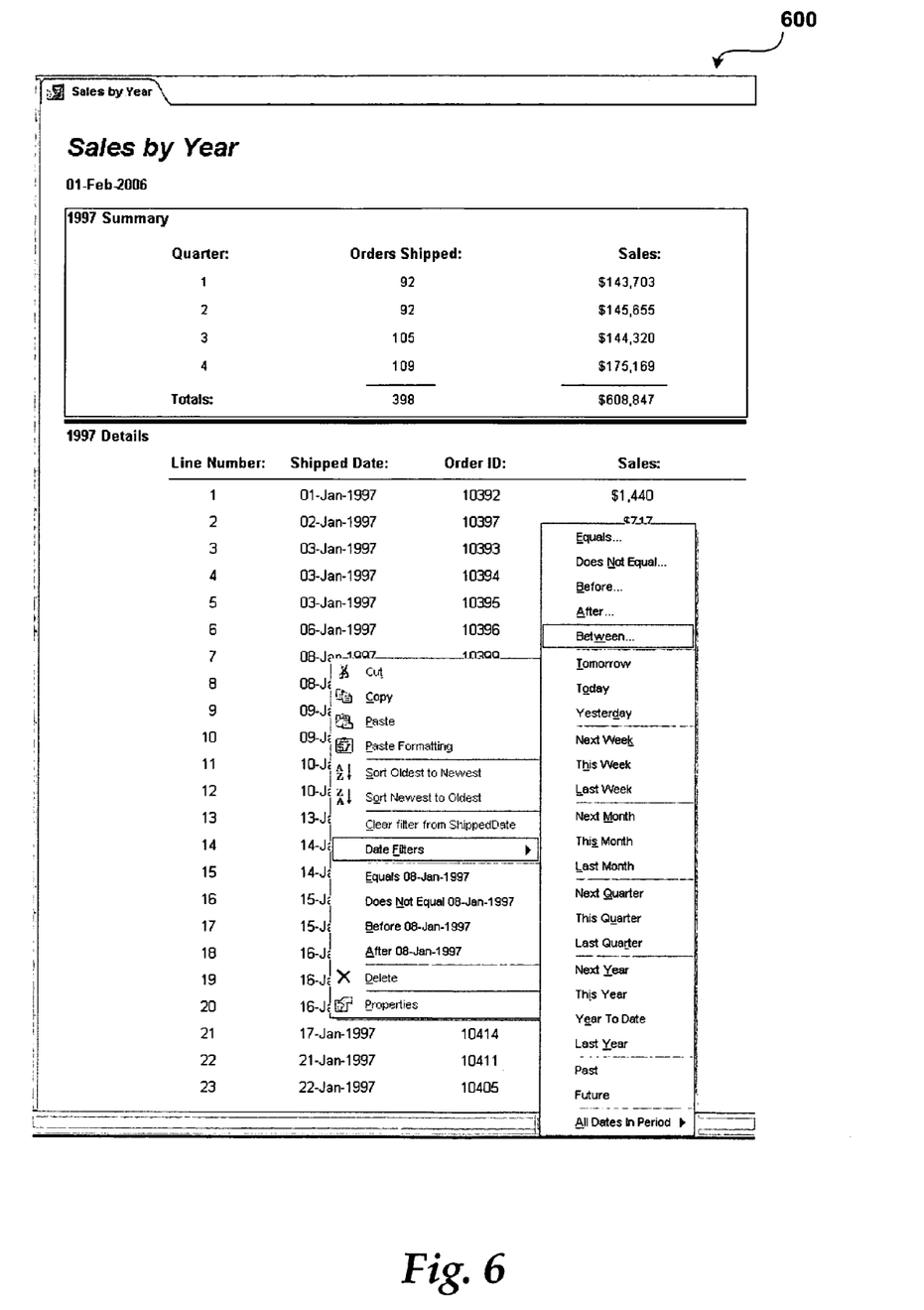
FIG. 6 illustrates the exemplary report of FIG. 5 with a selection being made to filter the query results corresponding to the report.

FIG. 6 illustrates the exemplary report of FIG. 5 with a selection being made to filter the query results corresponding to the report, in accordance with the present disclosure. The selection being made in report 600 is to filter the results according to date filters that indicate to limit the result to those occurring between two dates specified.

Figure 7:
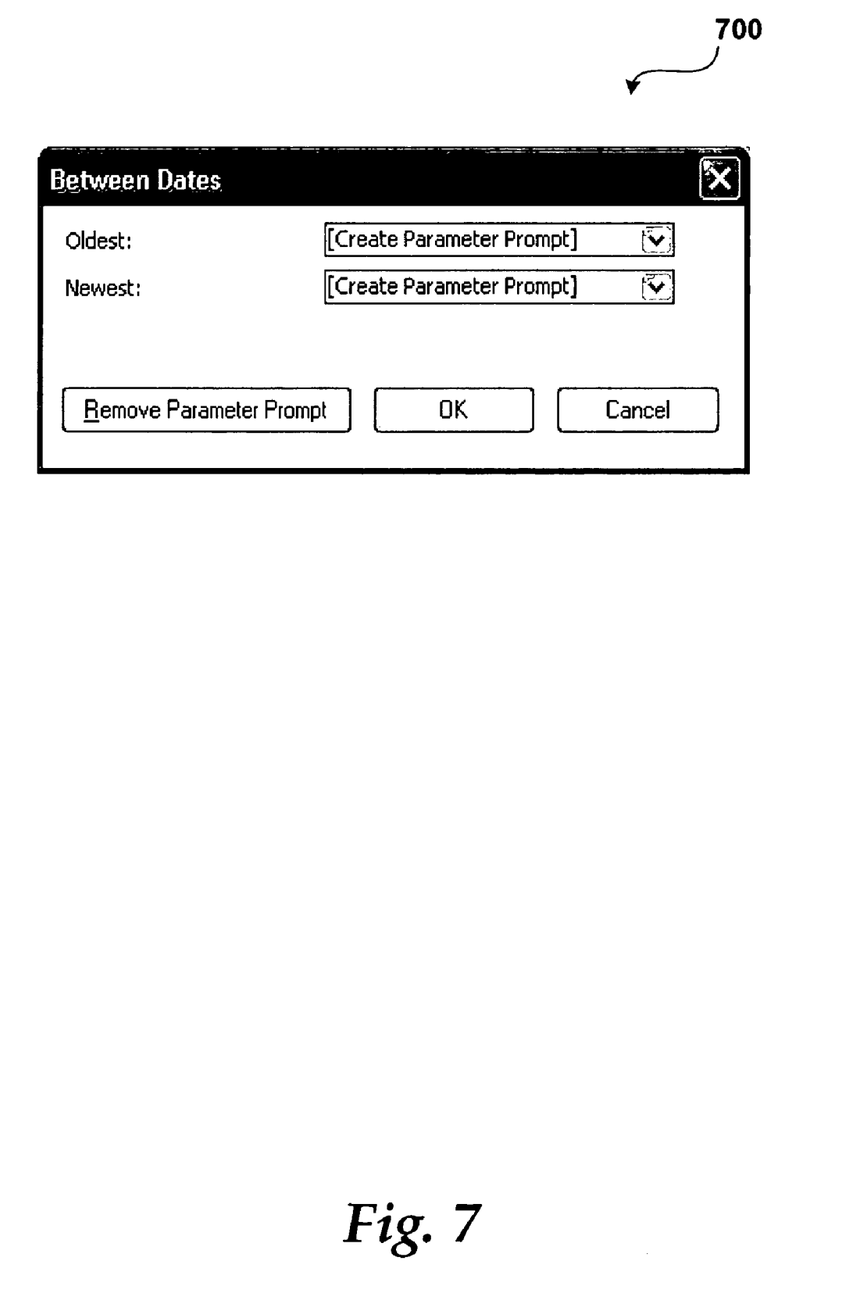
FIG. 7 illustrates an exemplary parameter generation form.

FIG. 7 illustrates an exemplary parameter generation form, in accordance with the present disclosure. Parameter generation form 700 allows the developer of the parameter form to select to customize the parameter prompts for entry of the parameters. Selecting to create the parameters places the prompt in an edit mode for designing the prompts and control for the parameters.

Figure 8:
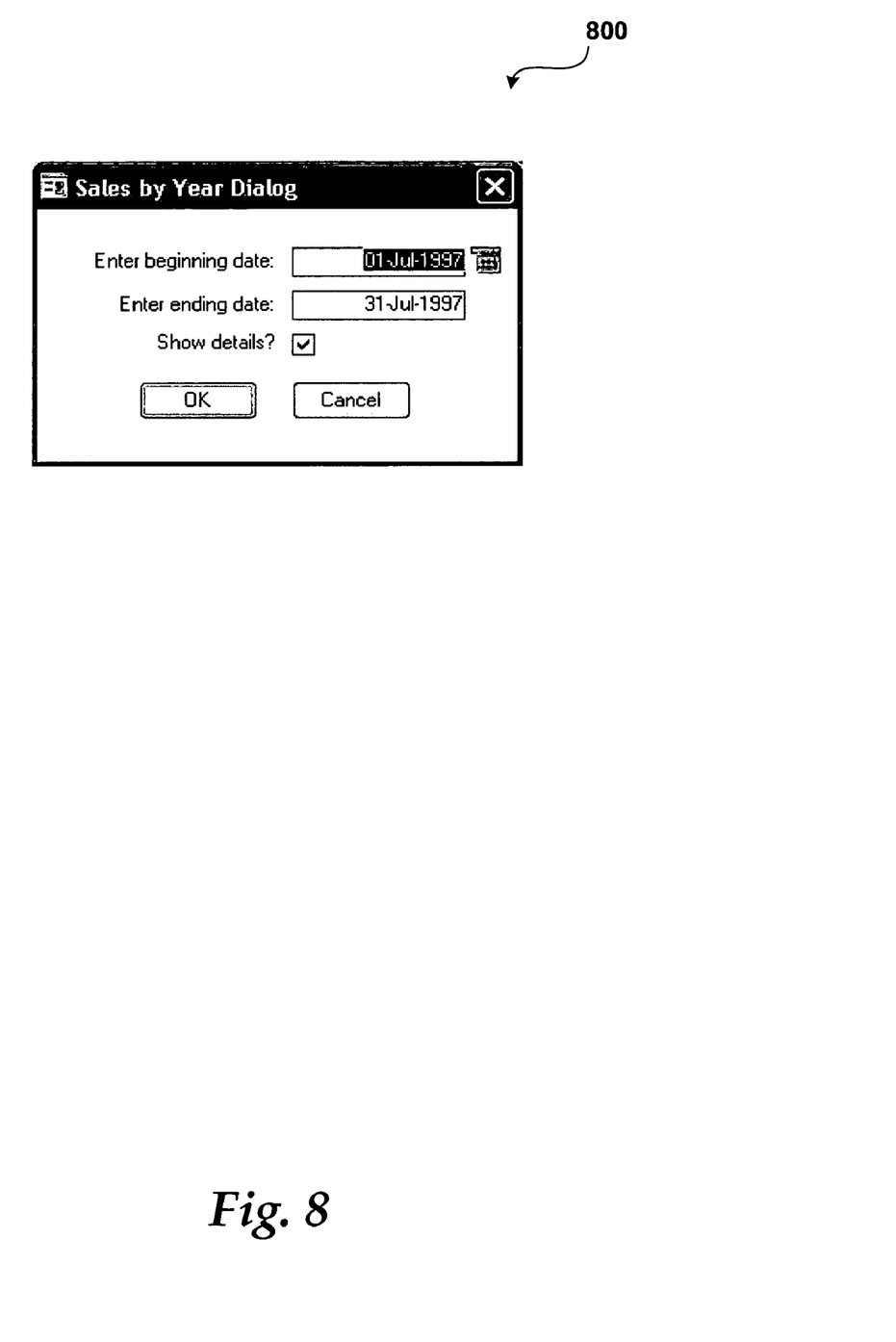
FIG. 8 illustrates an exemplary parameter entry form that has not been customized.
Figure 9:
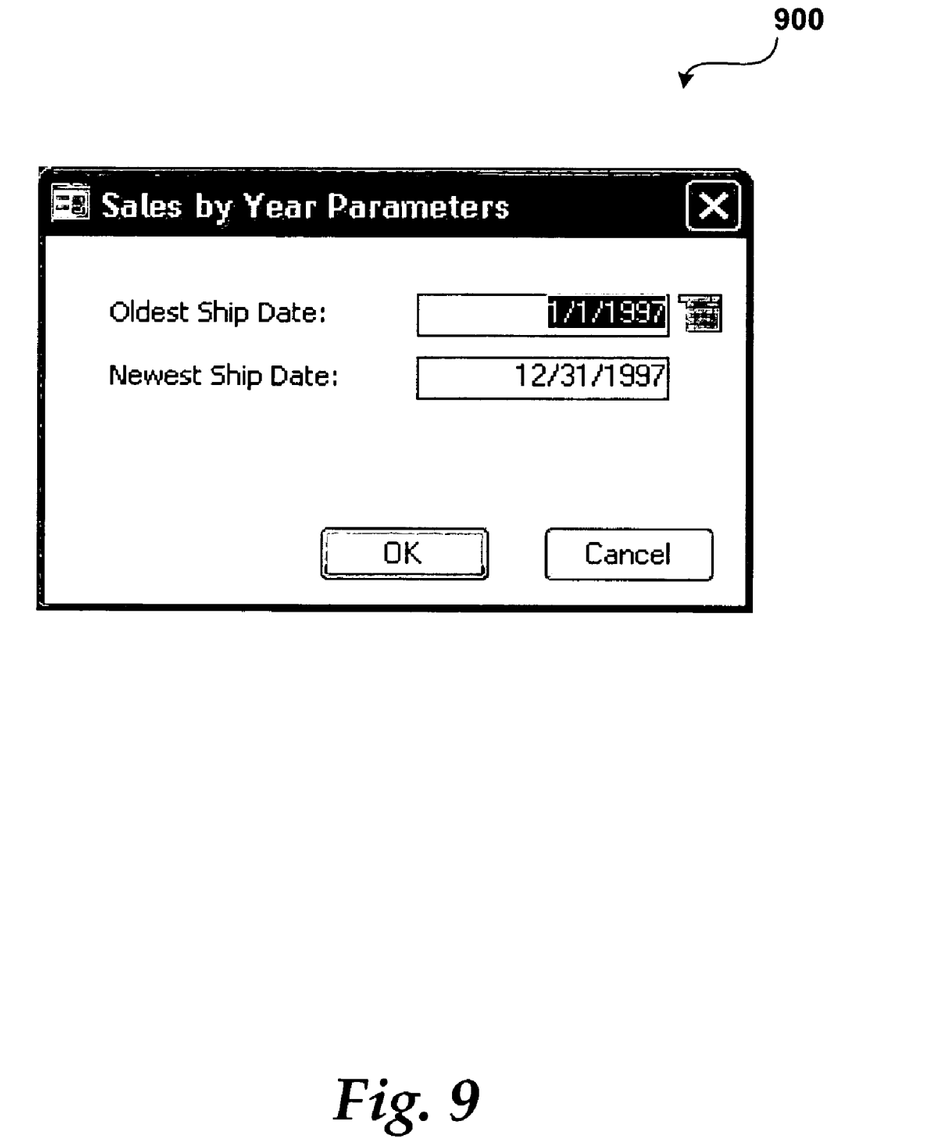
FIG. 9 illustrates an exemplary customized parameter entry form.

FIG. 8 illustrates an exemplary parameter entry form that has not been customized according to the present disclosure. Parameter entry form 800, has no specified information for the report to which the prompt is associated. In contrast, FIG. 9 illustrates an exemplary customized parameter entry form, in accordance with the present disclosure. Customized parameter entry form 900 shows marked difference from the parameter entry form of FIG. 8. Customized parameter entry form 900 includes information that illustrates its related to the form for which it has been generated. For example, the prompt for the form, instead of merely describing a start and end date, illustrates an "oldest ship date" and "newest ship date". The title of the form has also changed. The customized parameter entry form 900 may include additional logic for populating a drop down display frame with distinct values. As an example, depending on authoring needs, default values may be obtained from a database setting or calculated for a particular year. The customizations of the form, allow for more seamless user experience when entering parameters for search queries of a database.

Figure 10:
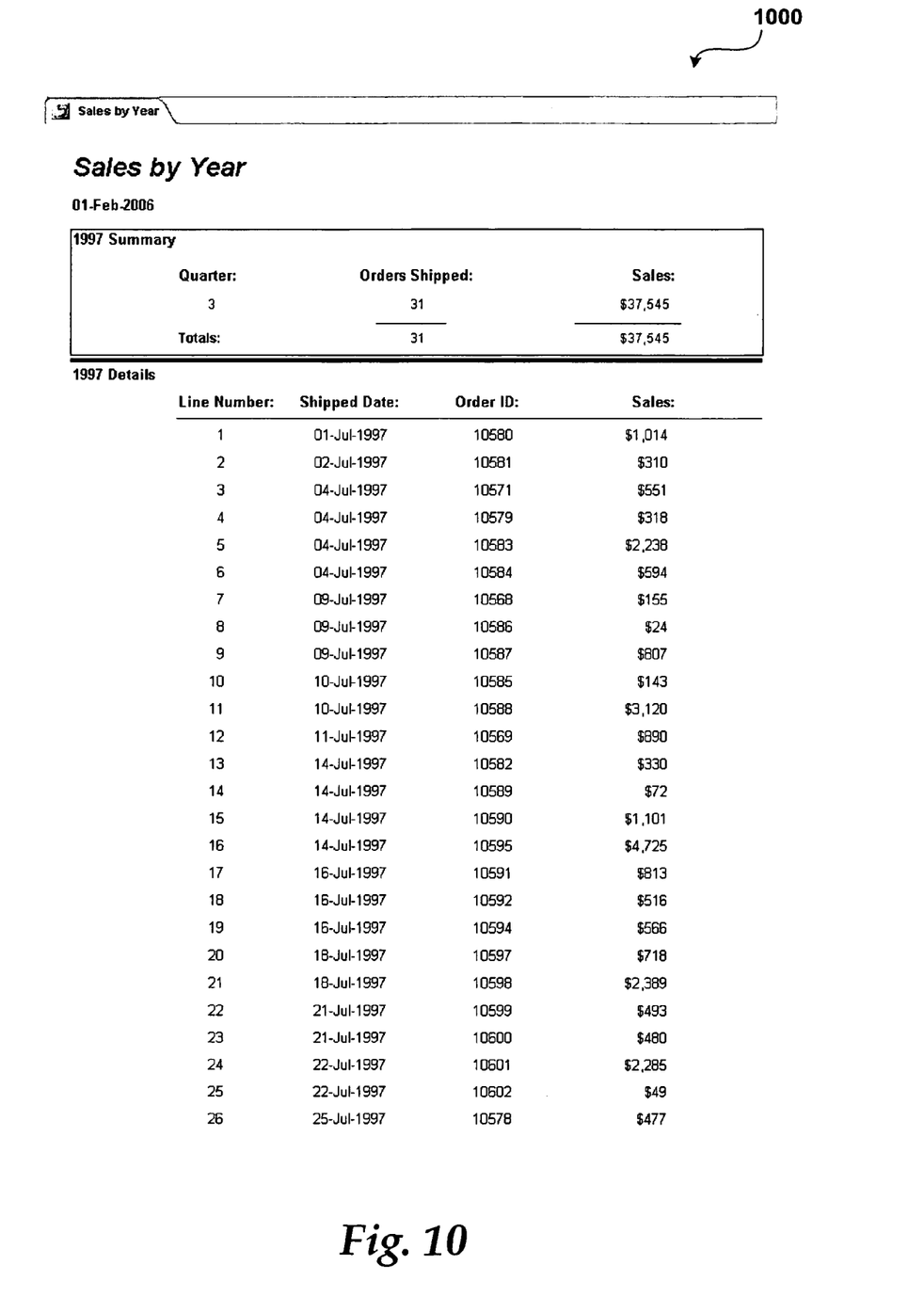
FIG. 10 illustrates the report of FIGS. 5 and 6 with the results modified according the entered parameters.

FIG. 10 illustrates the report of FIGS. 5 and 6 with the results modified according the entered parameters, in accordance with the present disclosure. Report 1000 illustrates a display frame having ship dates for the query results as modified by ship dates entered into a customized parameter form.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for providing a user interface for entering parameters associated with a database query statement, the method comprising:
    generating a database query statement for retrieving data from a database that is displayed within a data view; wherein the data view comprises a view of the data retrieved from the database;
    sending the query statement to a database engine for execution;
    the database engine determining that the query statement is not executable as received, and in response, returning a parameter request that requests entry of at least one additional parameter; and
    accessing a property list to determine when a customized parameter form exists to receive entry of the at least one additional parameter, wherein the customized parameter form is a custom designed form that is created for entry of the at least one additional parameter by receiving an entry of a customization of a prompt for the at least one additional parameter that is different from a default prompt displayed with a general parameter form to receive entry of the at least one additional parameter;
    determining when to display the general parameter form to receive entry of the at least one additional parameter and when to display the customized parameter form to receive the entry of the at least one additional parameter;
    in response to determining that the customized parameter form does not exist, displaying the general parameter form and a control generated on the form for entry of the at least one additional parameter and displaying the general parameter form to receive entry of the at least one additional parameter when the property list indicates that a customized parameter form does not exist to receive the at least one additional parameter and is not associated with the data view;
    in response to determining that the customized parameter form exists, displaying the customized parameter form to receive entry of the at least one additional parameter when the property list indicates that the customized parameter form exists for entry of the at least one additional parameter; wherein the customized parameter form includes values obtained from the database relating to the data view, wherein the values obtained from the database are used as default values to receive the at least one additional parameter and wherein prompts of the customized parameter form are modified based on the values; and
    executing the query statement with a modified value of the parameter.

2. The computer-implemented method of claim 1, wherein the data view includes at least one of: a form, a report, and a table.

3. The computer-implemented method of claim 1, wherein the property list includes a record source property that represents the query statement that indicates the data view.

4. The computer-implemented method of claim 1, wherein the property list includes a parameter filter property for adding a parameter to the query statement according to a Boolean operation to modify results associated with the data view.

5. The computer-implemented method of claim 1, further comprising modifying the data view by altering the query statement.

6. The computer-implemented method of claim 1, wherein the property list includes a parameter form property that indicates that a customized parameter form is associated with the data view.

7. The computer-implemented method of claim 1, wherein the values obtained from the database relating to the data view included on the customized parameter form are static values.

8. The computer-implemented method of claim 1, wherein the customized parameter form includes text blocks specific to the data view.

9. The computer-implemented method of claim 1, wherein the customized parameter form is configured to provide at least one of: an additional property, an additional filter property, and a control.

10. The computer-implemented method of claim 1, further comprising modifying the data view in association with a parameter of the customized parameter form, wherein the data view is modified without altering the query statement.

11. A computer-readable memory storing computer executable instructions for entering parameters associated with a database query statement comprising:
    generating a database query statement for retrieving data from a database that is displayed within a data view;

wherein the data view comprises a view of the data retrieved from the database;

sending the query statement to a database engine for execution;

the database engine determining that the query statement is not executable as received, and in response, returning a parameter request that requests entry of at least one additional parameter; and accessing a property list to determine when a customized parameter form exists to receive entry of the at least one additional parameter, wherein the customized parameter form is a custom designed form that is created for entry of the at least one additional parameter by receiving an entry of a customization of a prompt for the at least one additional parameter that is different from a default prompt displayed with a general parameter form to receive entry of the at least one additional parameter;

determining when to display the general parameter form to receive entry of the at least one additional parameter and when to display the customized parameter form to receive the entry of the at least one additional parameter;

in response to determining that the customized parameter form does not exist, displaying the general parameter form and a control generated on the form for entry of the at least one additional parameter and displaying the general parameter form to receive entry of the at least one additional parameter when the property list indicates that a customized parameter form does not exist to receive the at least one additional parameter and is not associated with the data view;

in response to determining that the customized parameter form exists, displaying the customized parameter form to receive entry of the at least one additional parameter when the property list indicates that the customized parameter form exists for entry of the at least one additional parameter; wherein the customized parameter form includes values obtained from the database relating to the data view, wherein the values obtained from the database are used as default values to receive the at least one additional parameter and wherein prompts of the customized parameter form are modified based on the values; and executing the query statement with a modified value of the parameter.

12. The computer-readable memory of claim 11, wherein the property list includes a record source property that represents the query statement that indicates the data view.

13. The computer-readable memory of claim 11, wherein the property list includes a parameter filter property for adding a parameter to the query statement according to a Boolean operation to modify results associated with the data view.

14. The computer-readable memory of claim 11, further comprising modifying the data view by altering the query statement.

15. The computer-readable memory of claim 11, wherein the customized parameter form is configured to provide at least one of: an additional property, an additional filter property, and a control.

16. The computer-readable memory of claim 11, further comprising modifying the data view in association with a parameter of the customized parameter form, wherein the data view is modified without altering the query statement.

17. A system for displaying a customized property form, the method comprising:
a processor and a computer-readable memory;
an operating environment stored on the computer-readable medium and executing on the processor; and
a database management system operating under the control of the operating environment and operative to perform actions comprising:
generating a database query statement for retrieving data from a database that is displayed within a data view; wherein the data view comprises a view of the data retrieved from the database;

sending the query statement to a database engine for execution;

the database engine determining that the query statement is not executable as received, and in response, returning a parameter request that requests entry of at least one additional parameter; and accessing a property list to determine when a customized parameter form exists to receive entry of the at least one additional parameter, wherein the customized parameter form is a custom designed form that is created for entry of the at least one additional parameter by receiving an entry of a customization of a prompt for the at least one additional parameter that is different from a default prompt displayed with a general parameter form to receive entry of the at least one additional parameter;

determining when to display the general parameter form to receive entry of the at least one additional parameter and when to display the customized parameter form to receive the entry of the at least one additional parameter;

in response to determining that the customized parameter form does not exist, displaying the general parameter form and a control generated on the form for entry of the at least one additional parameter and displaying the general parameter form to receive entry of the at least one additional parameter when the property list indicates that a customized parameter form does not exist to receive the at least one additional parameter and is not associated with the data view;

in response to determining that the customized parameter form exists, displaying the customized parameter form to receive entry of the at least one additional parameter when the property list indicates that the customized parameter form exists for entry of the at least one additional parameter; wherein the customized parameter form includes values obtained from the database relating to the data view, wherein the values obtained from the database are used as default values to receive the at least one additional parameter and wherein prompts of the customized parameter form are modified based on the values; and executing the query statement with a modified value of the parameter.

18. The system of claim 17, wherein the property list includes a parameter filter property for adding a parameter to the query statement according to a Boolean operation to modify results associated with the data view.

19. The system of claim 17, further comprising modifying the data view without altering the query statement.

20. The system of claim 17, wherein the property list includes a parameter form property that indicates that a customized parameter form is associated with the data view.

* * * * *